April 19, 1949. M. J. WALKER 2,468,004
AUTOMATIC PROPELLER PITCH CHANGING MECHANISM
Filed April 1, 1944 3 Sheets-Sheet 1
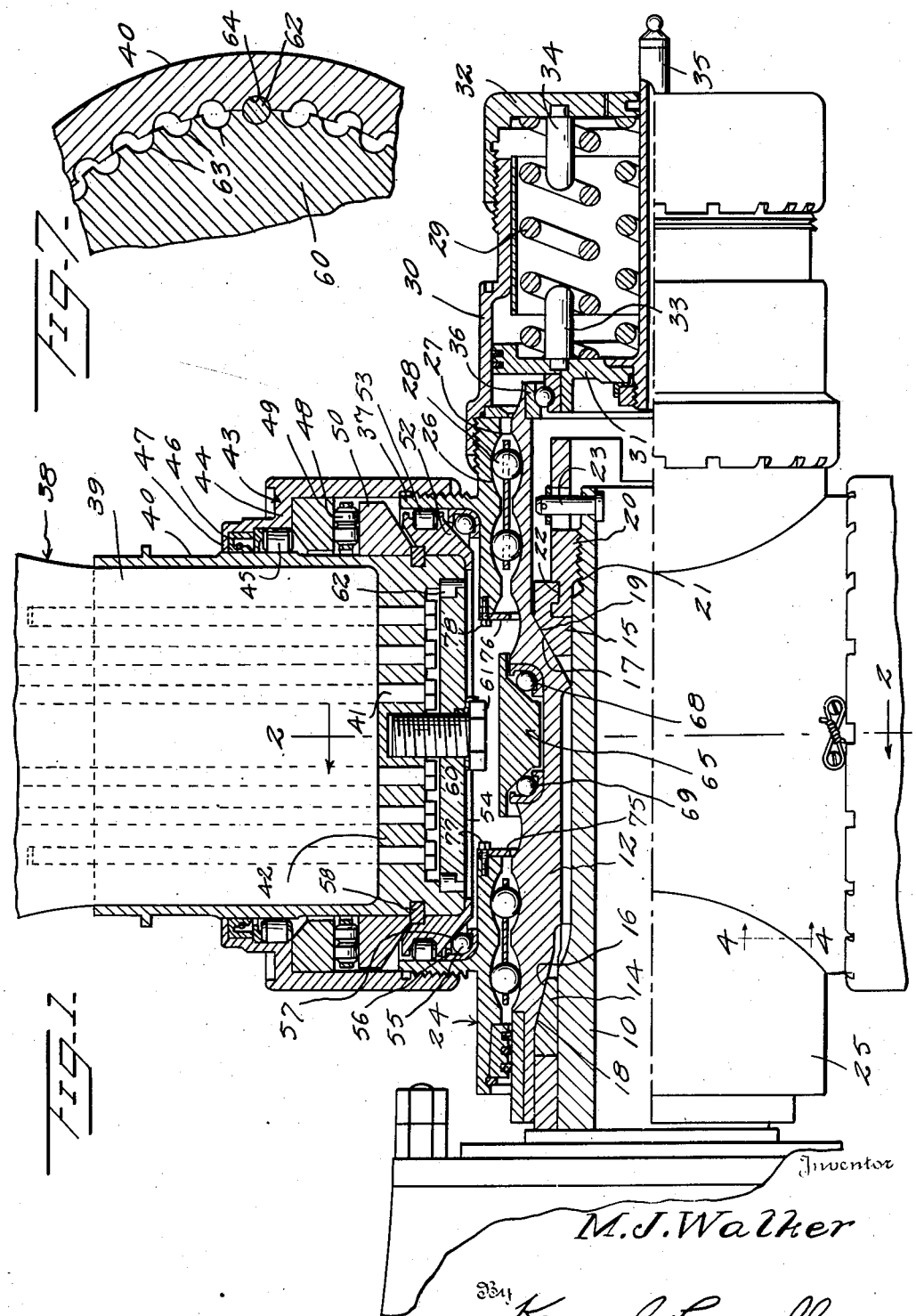
Inventor
M. J. Walker
By Kimmel & Crowell Attorneys April 19, 1949.  M. J. WALKER  2,468,004
AUTOMATIC PROPELLER PITCH CHANGING MECHANISM
Filed April 1, 1944  3 Sheets-Sheet 2
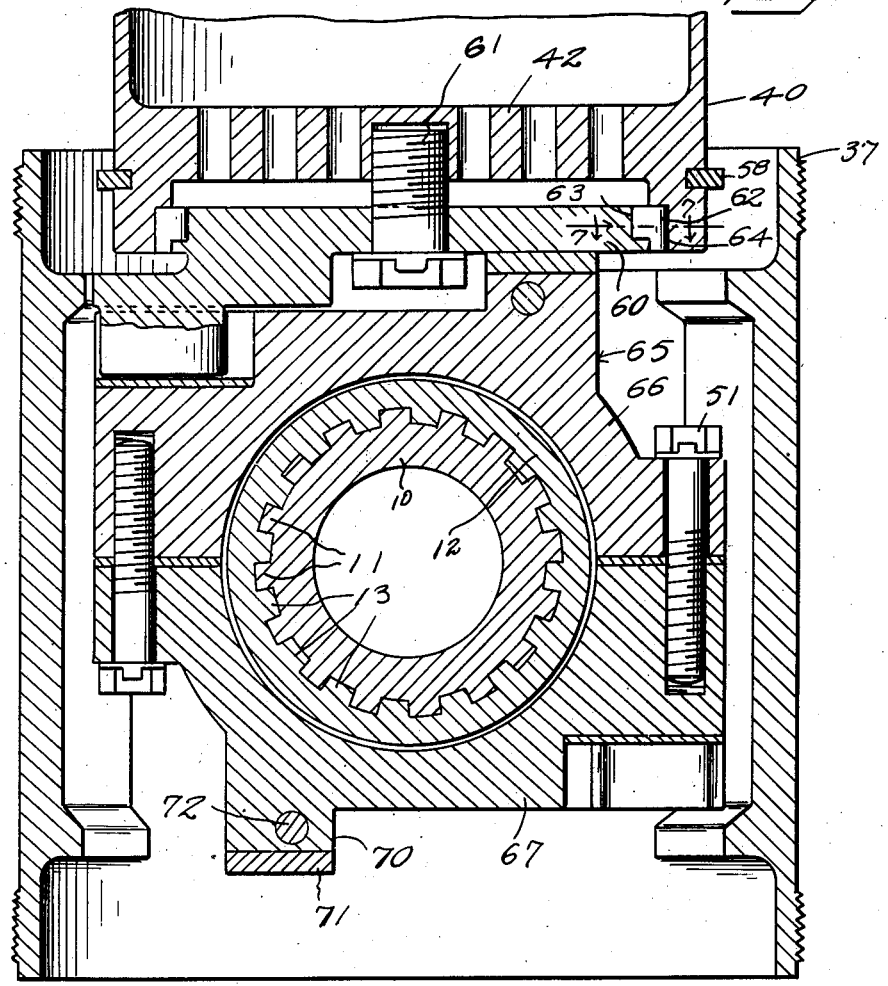
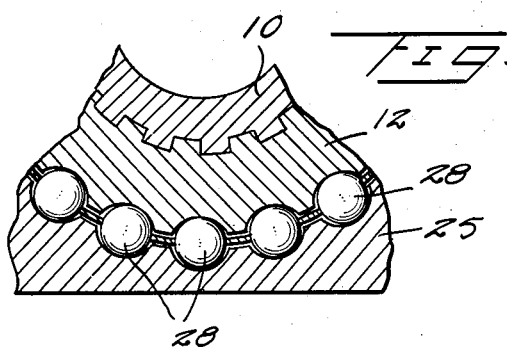
Inventor
M. J. Walker
By Kimmel & Crowell
Attorneys April 19, 1949.  M. J. WALKER  2,468,004
AUTOMATIC PROPELLER PITCH CHANGING MECHANISM
Filed April 1, 1944  3 Sheets-Sheet 3
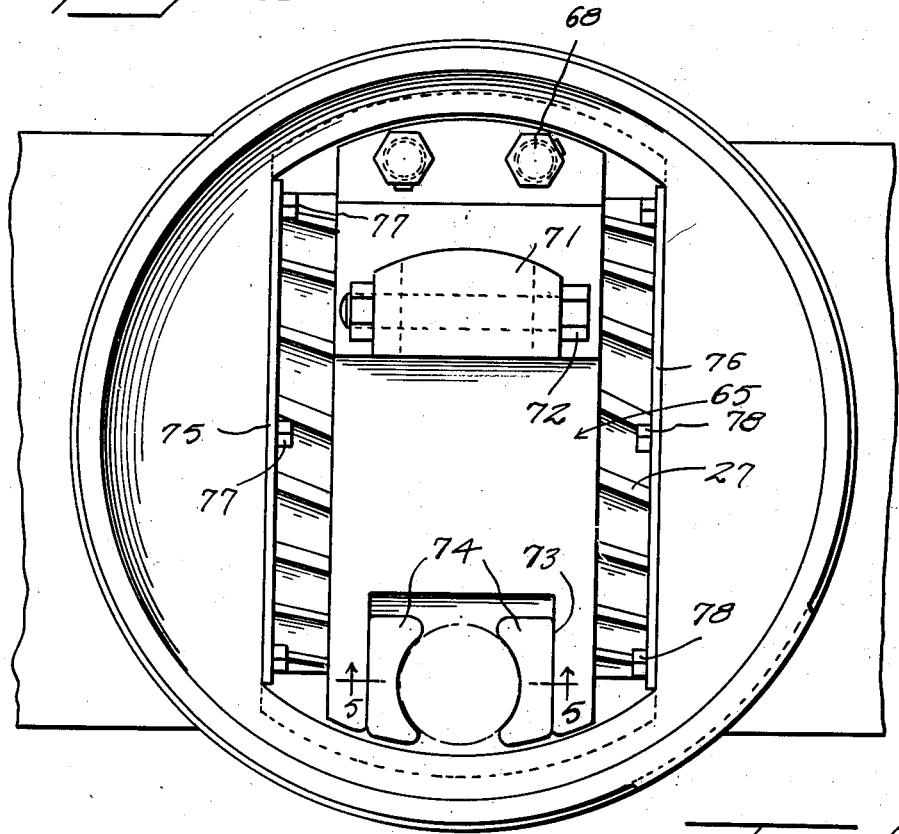
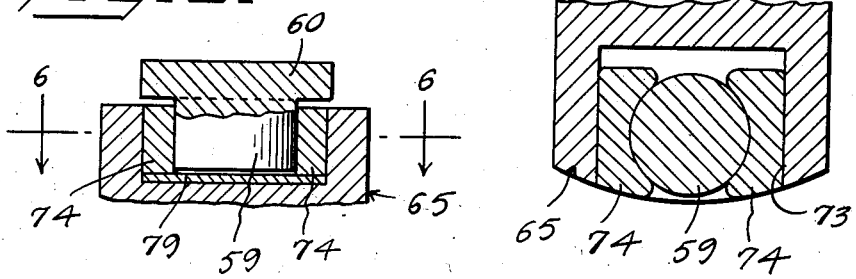
Inventor
M. J. Walker
By Kimmel & Crowell
Attorneys Patented Apr. 19, 1949

2,468,004

UNITED STATES PATENT OFFICE 2,468,004

AUTOMATIC PROPELLER PITCH CHANGING MECHANISM

Marvin J. Walker, Philadelphia, Pa., assignor of one-half to Robert Brooks Keller, New York, N. Y.

Application April 1, 1944, Serial No. 529,142

1 Claim. (Cl. 170—160.49)

This invention relates to propellers and more particularly to aircraft propellers.

An object of this invention is to provide means for obtaining maximum propeller and engine efficiencies over a range of forward velocities and altitudes.

Another object of this invention is to provide means for absorbing the desired engine power at an efficient engine speed, thereby resulting in increased overall engine performance.

A further object of this invention is to provide an automatic propeller blade pitch changing means wherein the forces of thrust and torque are utilized to provide for the automatic changing of the propeller pitch.

A further object of this invention is to provide an improved pitch changing mechanism which is simple, light, compact, inexpensive to manufacture, and is a complete and self-contained unit within the hub of the propeller.

A further object of this invention is to provide an improved means for securing the propeller blades to the hub whereby the blades may rotate about their longitudinal axes, the rotation of the blades about their longitudinal axes being a function of the torsional stress on the hub and the aerodynamic thrust on the propeller blades.

With the foregoing objects and others which may hereinafter appear, the invention consists of the novel construction, combination and arrangement of parts as will be more specifically referred to and as illustrated in the accompanying drawings, wherein is shown an embodiment of the invention, but it is to be understood that changes, modifications and variations may be resorted to which fall within the scope of the invention as claimed.

In the drawings:

Figure 1 is a fragmentary side elevation partly in section of a propeller embodying a pitch changing mechanism constructed according to an embodiment of this invention, Figure 2 is a fragmentary sectional view taken on the line 2—2 of Figure 1, Figure 3 is a fragmentary plan view of the hub portion of the device, Figure 4 is a fragmentary sectional view taken substantially on the line 4—4 of Figure 1, Figure 5 is a fragmentary sectional view taken on the line 5—5 of Figure 3, and Figure 6 is a sectional view taken on the line 6—6 of Figure 5.

Figure 7 is a fragmentary sectional view taken on line 7—7 of Fig. 2.

Referring to the drawings, the numeral 10 designates a drive shaft connected to an airplane engine, and in the present instance, the shaft 10 is hollow and is formed on the exterior thereof with splines 11. A cylindrical sleeve 12 having splines 13 is mounted on the shaft 10 and is held against endwise movement with respect to the shaft 10 by means of a rear collar 14 and a forward collar 15. The two collars 14 and 15 are tapered as indicated at 16 and 17, respectively, and the adjacent portions of the sleeve 12 are also tapered as indicated at 18 and 19, respectively, so that the tightening of the collar 15 will hold the sleeve 12 on the shaft 10 firmly. A nut 20 is threaded on the outer end of the shaft 10 and is provided with an annular groove 21 within which an annular rib 22 carried by the collar 15 loosely engages so that the collar 15 may be moved to either tightened or loosened position on the shaft 10. The nut 20 is held against rotary movement with respect to the shaft 10 by means of one or more locking pins 23 extending through the outer portion of the shaft 10 and through the nut 20.

A propeller hub, generally designated as 24, is disposed about the sleeve 12 and comprises a central cylindrical body 25 which is formed on the inner side thereof with spiral grooves 26. The outer surface of the sleeve 12 is also formed with spiral grooves 27 complementary to the grooves 26, and a plurality of balls 28 are positioned within the grooves 26 and 27 so that rotary movement of the body 25 with respect to the sleeve 12 will effect endwise movement of the body 25, the purpose for which will be hereinafter described. Preferably, the pitch of the grooves 26 and 27 is such that upon rotation of the sleeve 12 with the shaft 10, the body 25 will be moved rearwardly or towards the engine with which the shaft 10 is coupled.

The hub 24 is constantly urged forwardly by means of a plurality of springs 29 which are disposed within a cylindrical member 30 which is threaded on its inner end on the outer end of the body 25. The springs 29 at their inner ends bear against an annular plate 31 which is slidably mounted within the cylindrical member 30. The springs 29 at their outer ends bear against a cap 32 which is threaded on the outer end of the cylindrical member 30, and the cap 32 provides a means whereby the springs 29 may be tensioned to the desired degree. Preferably, anchoring pins 33 are carried by the plate 31 and engage within the inner ends of the springs 29 and additional anchoring pins 34 are carried by the inner side of the cap 32 and engage within the outer ends of the springs 29.

An oil lubricant fitting 35 is carried by the plate 31 and extends through the cap 32, the fitting 35 being provided so that a suitable lubricant may be discharged into the space rearwardly of the plate 31. The plate 31 is connected to the outer end of the sleeve 12 by means of an anti-friction bearing 36 so that the plate 31 will be held against endwise movement with respect to the sleeve 12 but will be permitted sliding movement within the cylindrical member 30.

The hub 24 includes a plurality of cylindrical bosses 37 which extend radially from the body 25. There may be two or more of these bosses 37 depending on the number of propeller blades which form the complete propeller structure. A propeller blade, generally designated, as 38 has the inner end or shank 39 thereof fixedly mounted in a cup-shaped member 40. The shank 39 is tightly secured within the member 40 by means of fastening bolts 41 which engage through the inner wall 42 of the member 40. In order to provide a means whereby the member 40 may be rotatable with respect to the boss 37, we have provided a cap 43 which is threaded onto the boss 29 and is formed with a flange 44 adjacent the outer end thereof. A roller bearing 45 engages between the inner edge of the flange 44 and the adjacent side of the shank holding member 40 and a seal 46 is positioned between the roller bearing 45 and an outer flange 47 carried by the cap 43. The rollers of the roller bearing 45 have the axes thereof parallel with the axis of the blade shank 39 and are adapted to take up any lateral thrust on the shank 39. The cap 43 also encloses a second roller bearing structure 48, the rollers of which have the axes at right angles to the axis of the shank 39 and the rollers 48 are adapted to take up endwise thrust on the blade 38.

The roller bearings 48 engage between races 49 and 50 disposed within the cap 39. A roller bearing race 52 is also carried by the inner end of the end wall 42 and the axes of the rollers 53 are parallel with the axis of the shank 39. The rollers 53 cooperate with rollers 45 in taking up lateral stress on the shank 39. The race 52 at its inner end is formed with an annular flange 54 overlapping the inner end of the coupling member 40, the flange 54 holding the socket 40 against inward movement.

The race 52 also constitutes one race of a ball bearing structure, balls 55 carried by a cage 56 engaging against the race forming surface 57 formed on the inner end of the roller race 52. A locking ring 58 is carried by the inner portion of the coupling member 40 and limits the inward movement of the ring 51 within the cap 43 and also limits outward movement of the race 52 with respect to the coupling member 40.

In order to provide a means whereby the blade 38 will be rotated to vary the pitch thereof coincident with the rotation of the shaft 10, we have provided an eccentrically disposed pin 59 which is carried by a plate 60 secured by a fastening member 61 to the inner side of the end wall 42. Preferably, the plate 60 is secured against rotation relative to the socket 40 by means of pins 62 (Fig. 7) which engage in selected complementary recesses 63 and 64 carried by the socket 40 and the plate 60, respectively. In this manner the axial position of socket or coupling member 40 can be very finely adjusted and locked relative to plate 60.

A blade operator generally designated as 65 is mounted within the hub 24. The operator 65 includes complementary cage forming members 66 and 67 which are secured together by fastening members 51. The operator or cage 65 is rotatably mounted on the sleeve 12 engaging about the sleeve 12 substantially in line with the axes of the blades 38. Preferably, anti-friction bearings 68 and 69 are interposed between the cage 65 and the sleeve 12 so that the sleeve 12 may freely rotate relative to the cage 65. The cage 65 is held against rotation within the hub 24 by means of oppositely disposed bosses 70 which have shims 71 mounted thereon, the shims 71 engaging against the inner side of the plate 60. The shims 71 are secured to the bosses 70 by fastening members 72, and preferably, the shims 71 are U-shaped in side elevation, the parallel sides of the shims 71 overlapping the opposite sides of the bosses 70.

The cage 65 is provided with a slot 73 within which the pin 59 loosely engages and preferably a pair of slide blocks 74 are interposed between the pin 59 and the opposite parallel sides of the slot 73 so that the pin 59 may have relative sliding movement in addition to rotary movement with respect to the cage 65. The hub 24 is limited in its endwise movement with respect to the sleeve 12 by means of oppositely disposed stop rings 75 and 76. The stop members or rings 75 and 76 are secured to the inner ends of the hub forming boss 25 by fastening members 77 and 78, respectively. As will be noted from Figure 5 the inner end of the pin 59 bears against a wear plate 79 which is mounted in the bottom of the slot 73 and on which the slide blocks 74 slidingly engage.

In the use and operation of this propeller pitch changing mechanism the hub 24 is mounted on the shaft 10 with the sleeve 12 splined to the shaft 10 and secured by the holding nut 20. The shanks 39 of the blades 38 are mounted in the coupling member 40 and the springs 29 are tensioned by adjustment of the outer cap 32. The springs 29 will normally urge the hub 24 forwardly whereas on rotation of the shaft 10, the spiral coupling between the hub 24 and the sleeve 12 will torsionally urge the hub 24 rearwardly.

It will be apparent from the foregoing that the variation of the pitch of the propeller blades 39 will be dependent upon the power of the shaft 10 and the thrust force applied to the blades 38 during the rotation thereof about the axis of the shaft 10. During the initial rotation of the shaft 10, the torsional pull on hub 24 will be at substantially its maximum so that hub 24 will be moved endwise rearwardly against the tension of the springs 29.

Propeller pitch increases as the velocity of the aircraft increases between static or 0 velocity to its high speed velocity, thereby maintaining constant propeller R. P. M. for a particular throttle or engine power setting. In the event additional power is applied to shaft 10, the additional torsional strain will pull hub 24 rearwardly, thereby increasing the propeller pitch so that the pitches of the several blades connected to the hub vary according to the power applied thereto. This variation in propeller pitch also applies by reason of reduction in the density of air through which the airplane is passing. In other words, when the density of air decreases, the power will be proportionately greater and this variation between the applied power and the air density will cause the hub 24 to be pulled rearwardly thereby increasing the propeller pitch.

It will be apparent therefore that the propeller pitch will be automatically varied as a function of the applied power and the forward velocity and air density. This device forms an exceedingly compact pitch changing mechanism which can be used with either two or more propeller blades and the mechanism being compact will not readily get out of order and will not add undue weight to the airplane due to the compactness thereof.

Where the propeller blade is made of metal the shank 39 and the socket 40 will be made in one piece, but in other respects the details for the metal propeller will be the same as herein disclosed.

What I claim is:

A variable pitch propeller comprising a hub for mounting on an engine shaft, said hub including an inner sleeve fixed on said shaft, an outer sleeve slidable on said inner sleeve, correlated means carried by said sleeves affecting rotation of said outer sleeve upon sliding on said inner sleeve, rotatable propeller blades radially mounted on said outer sleeve, a blade rotating member rotatably carried by said inner sleeve and slidably carried within said outer sleeve, an eccentric pin carried by said propeller blade axially thereof extending through an opening in said outer sleeve and engaging said blade rotating member for rotating said blades upon sliding of said outer sleeve, spring means urging said outer sleeve in one direction on said inner sleeve, the thrust of said blades relative to said engine shaft urging said outer sleeve against the spring tension.

MARVIN J. WALKER.

REFERENCES CITED

The following references are of record in the file of this patent:

UNITED STATES PATENTS

| Number | Name | Date |
| --- | --- | --- |
| 1,848,573 | Mattacchione | Mar. 8, 1932 |
| 1,864,045 | Kellogg | June 21, 1932 |
| 1,952,066 | Havill | Mar. 27, 1934 |
| 1,980,248 | Bates | Nov. 13, 1934 |
| 1,980,272 | Havill | Nov. 13, 1934 |
| 2,133,656 | Caldwell | Oct. 18, 1938 |
| 2,292,147 | Miller | Aug. 4, 1942 |

FOREIGN PATENTS

| Number | Country | Date |
| --- | --- | --- |
| 529,947 | France | Dec. 9, 1921 |
| 311,472 | Great Britain | May 16, 1929 |
| 798,926 | France | May 29, 1936 |
| 369,004 | Italy | Mar. 10, 1939 |
| 512,057 | Great Britain | Aug. 29, 1939 |